United States Patent [19]

Groff, Sr.

[11] Patent Number: 4,949,944

[45] Date of Patent: Aug. 21, 1990

[54] MODEL AIRPLANE JIG

[76] Inventor: James Groff, Sr., 292 New Brooklyn Rd., Sicklerville, N.J. 08081

[21] Appl. No.: 356,499

[22] Filed: May 25, 1989

[51] Int. Cl.[5] .................... B23Q 1/04

[52] U.S. Cl. .................... 269/45; 269/76; 269/71; 269/296

[58] Field of Search .................... 254/DIG. 1; 269/45, 269/69, 71, 76, 75, 296, 17

[56] References Cited

U.S. PATENT DOCUMENTS

| | | | |
|---|---|---|---|
| 568,543 | 9/1896 | Parks | 269/902 |
| 1,192,611 | 7/1916 | Field | 254/DIG. 1 |
| 2,669,958 | 2/1954 | Sweeney | 269/45 |
| 2,827,690 | 3/1958 | Brown | 269/17 |
| 4,145,006 | 3/1979 | Webb | 269/69 |

*Primary Examiner*—Robert C. Watson
*Attorney, Agent, or Firm*—Norman E. Lehrer

[57] ABSTRACT

A model airplane jig is disclosed which is particularly adapted to support a model gasoline engine airplane in substantially any position or orientation so that repairs can be made to the same. The jig includes a weighted base and a vertical post extending upwardly therefrom. A horizontal beam is pivotally connected to the top of the post through a ball joint and trunnion with the connection being radially offset from the axis of the post. Front and rear wheel clamps adjustably mounted adjacent the ends of the horizontal beam attach to the wheels of an airplane and secure the plane to the jig.

16 Claims, 6 Drawing Sheets

MODEL AIRPLANE JIG

BACKGROUND OF THE INVENTION

The present invention is directed toward a model airplane jig or workbench and, more particularly, toward such a device which is adapted to hold a gasoline-powered, radio-controlled model airplane in substantially any orientation or position so that repairs can be made to the same.

The flying of gasoline-powered, radio-controlled model airplanes is a hobby enjoyed by many thousands of people across the country. And as more powerful and lighter engines have been radio receivers and servos, the hobby has been growing steadily in popularity.

While many of the smaller planes are pre-manufactured and assembled, the majority of the larger models must be assembled by the user. The avid enthusiast, of course, prefers to build his own planes which usually have wing spans of three or four feet or more. In any case, all planes, whether pre-manufactured or home built need adjustment or repair from time to time.

Model airplanes are precision machines that must be finely tuned for them to fly properly. In particular, the roll, yaw and pitch must be accurately adjusted for proper operation. These, and other adjustments, however, require that the plane be securely held in a number of different positions or orientations while they are being made. By way of example, repairs to the underside of a fuselage can only be made if the plane is positioned upside down. Because of the very delicate construction of model planes, however, it is undesirable to merely, rest the plane upside down on a table. This, of course, assumes that one even has a large enough table. To Applicant's knowledge, no one has ever designed or proposed a jig or workbench which is suitable for supporting a model airplane in any position so that work can be performed thereon.

Devices have been proposed in the past for holding specific types of aircraft for constructing or making repairs to the same. U.S. Pat. No. 3,805,355, for example, shows a fixture for facilitating the accurate positioning and gluing of fins to the tubular body of a model rocket. And U.S. Pat. No. 4,026,535 shows a model aircraft construction jig which is specifically designed for aiding in the building of the fuselage and tail unit assemblies of aircraft. Each of these devices, however, has a very specific application and is not useful generally for the construction or repair of airplanes. Furthermore, neither of these devices is capable of allowing the airplane to be moved into different positions.

Jigs or work holders are also known which are capable of holding a workpiece and moving it into different positions. Examples of such devices can be seen in U.S. Pat. Nos. 1,474,212; 2,669,958 and 2,824,536. While these devices may have some application in the positioning of various types of workpieces, none is capable of properly supporting a model airplane.

SUMMARY OF THE INVENTION

The present invention is designed to overcome the deficiencies of the prior art and provides a model airplane jig which is particularly adapted to support a model gasoline engine airplane in substantially any position or orientation so that repairs can be made to the same. The jig includes a weighted base and a vertical post extending upwardly therefrom. A horizontal beam is pivotally connected to the top of the post through a ball joint and trunnion with the connection being radially offset from the axis of the post. Front and rear wheel clamps adjustably mounted adjacent the ends of the horizontal beam attach to the wheels of an airplane and secure the plane to the jig.

BRIEF DESCRIPTION OF THE DRAWINGS

For the purpose of illustrating the invention, there is shown in the accompanying drawings one form which is presently preferred; it being understood that the invention is no intended to be limited to the precise arrangements and instrumentalities shown.

DETAILED DESCRIPTION OF THE PREFERRED EMBODIMENT

Figure 1:
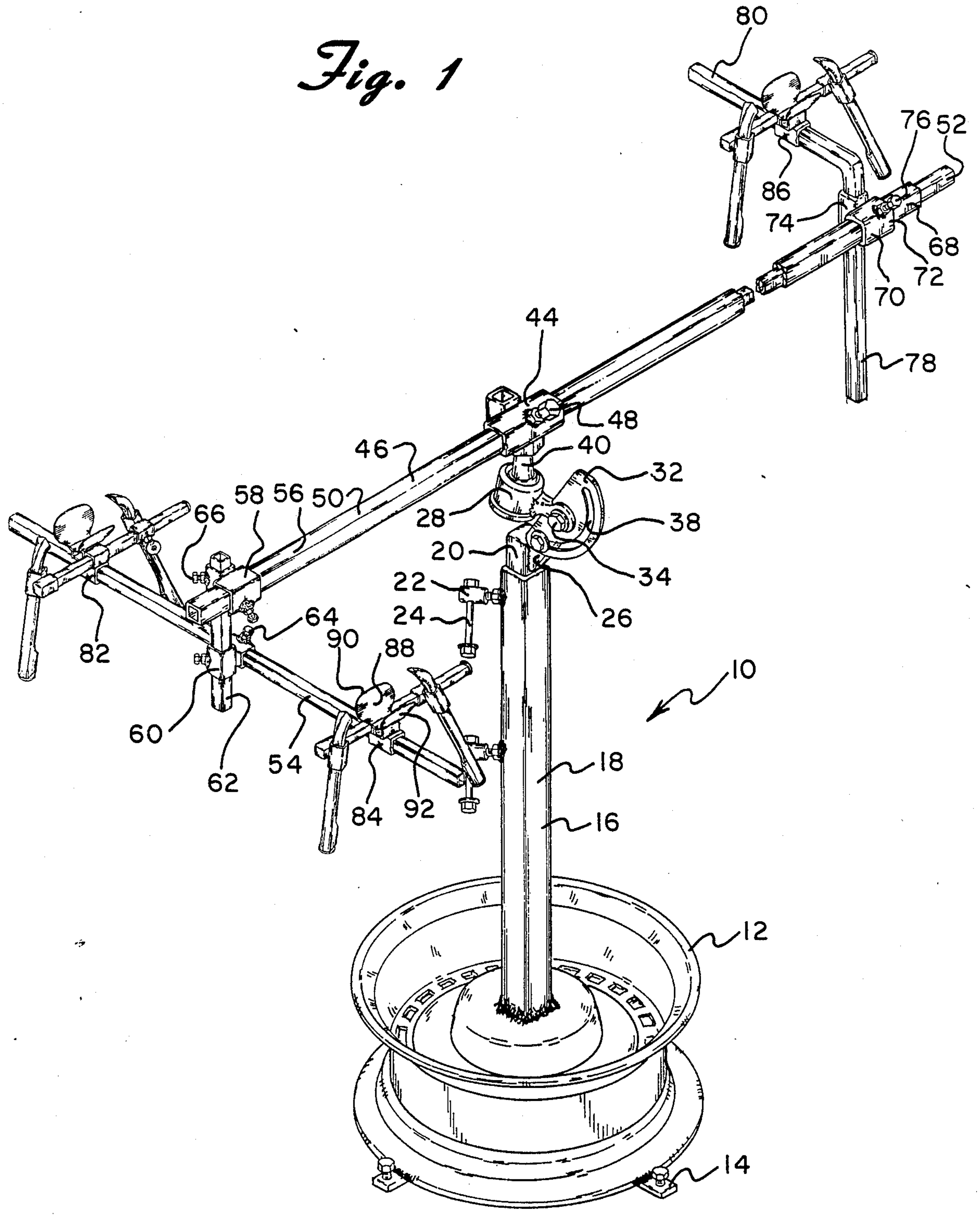
FIG. 1 is a front perspective view of a model airplane jig constructed in accordance with the principles of the present invention.
Figure 2:
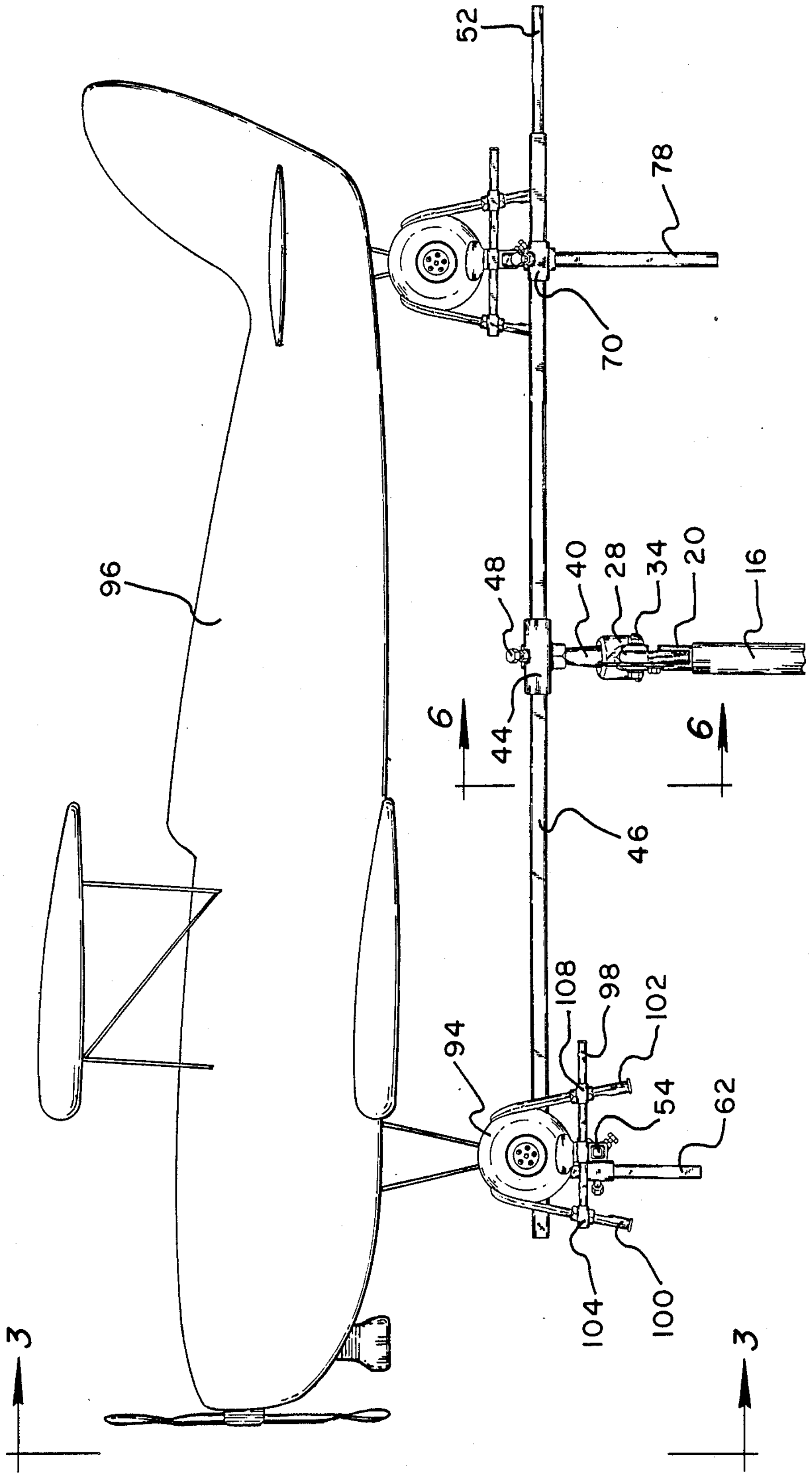
FIG. 2 is a side elevational view of the upper part of the jig shown in FIG. 1 and showing an airplane supported thereon.

Referring now to the drawings in detail wherein like reference numerals have been used throughout the various figures to designate like elements, there is shown in FIG. 1 a perspective view of a model airplane jig constructed in accordance with the principles of the present invention and designated generally as 10. The airplane jig or workbench 10 includes a weighted base member 12 which, although shown as being round, may take substantially any shape as long as it is of sufficient weight and configuration to prevent the device from tipping when the airplane is moved into various positions as shown more clearly below. A plurality of screw-type levelers such as shown at 14 are provided around the periphery of the base 12 and these can be adjusted to ensure that the base is properly aligned on a floor or other support surface.

Extending upwardly from the center of the weighted base 12 is a vertical post 16. Vertical post 16 is actually comprised of an outer tubular post 18 and an inner post 20 which telescopes upwardly or downwardly within the outer post 18. A set screw 22 which is rotatable through the use of handle 24 is used to fix the inner post member 20 at any desired height.

Figure 6:
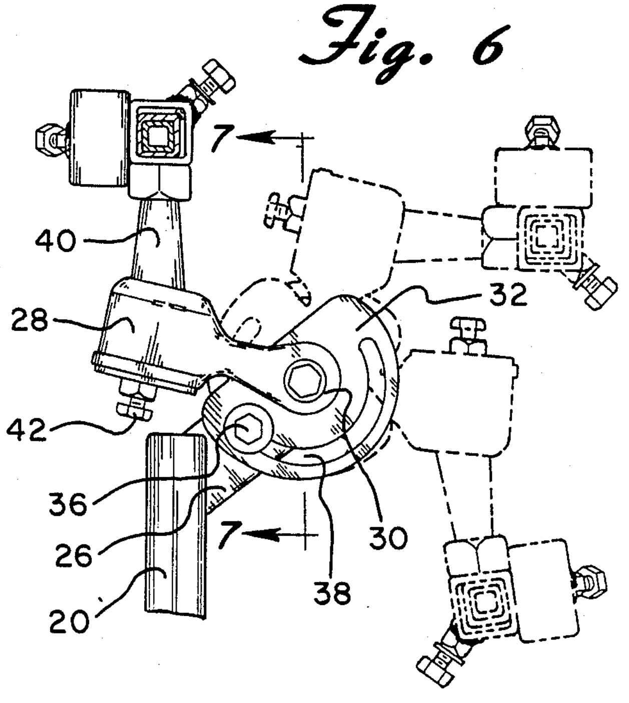
FIG. 6 is a cross-sectional view taken through the lines 6—6 of FIG. 2.
Figure 7:
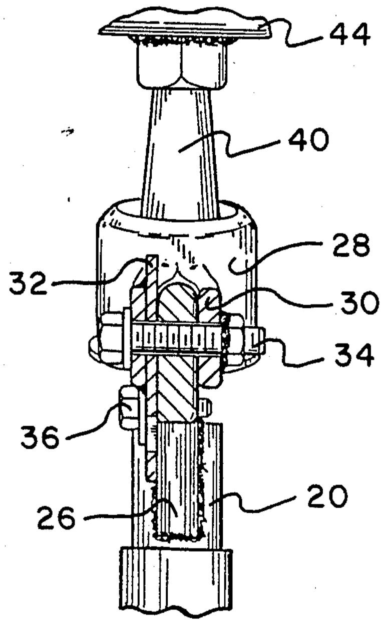
FIG. 7 is a cross-sectional view taken through the lines 7—7 of FIG. 6.

As is perhaps best shown in FIGS. 6 and 7, a tab 26 which may be of several inches in length is welded to the top of the post 20 and extends upwardly and outwardly therefrom away from the axis of the post 20. The lower portion of a ball joint 28 includes a yoke 30 extending outwardly to the side thereof which is secured to a trunnion 32. The trunnion and yoke, as a unit, are pivotally secured to the upper remote end of the tab 26 by bolt 34 which passes through openings in the tab, trunnion and yoke. As can be seen most clearly in FIG. 6, the ball joint 28 can, therefore, be pivoted from a first position wherein it substantially overlies the top of the post 20 through the positions shown in phantom where the ball joint extends outwardly to the side of the post 20 and is upside down, i.e. it has moved through an angle of approximately 180° . The ball joint and trunnion can be maintained in any intermediate position by tightening the bolt 36 which passes through the curved slot 38. The other end of the bolt 36 is threaded through an opening in the lower portion of the tab 26.

Extending upwardly from the lower ball joint portion 28 is an upper ball joint portion 40. By loosening the bolt 42, the ball joint portion 40 can be pivoted from side to side and front to back, etc. and can be rotated about the axis of the portion 40 which is also substantially about the axis of the post 16 when the ball joint is located in the position shown in FIG. 1. After the ball joint is rotated or pivoted into its desired position, it can be locked therein through the use of the bolt 42.

Secured to the upper end of the upper ball joint portion 40 is a short tubular sleeve 44. This sleeve 44 supports an elongated main beam 46 which may be several feet in length. The main beam 46 may be moved in substantially any position by sliding the same through the sleeve 44 and is locked in place through the use of bolt 48.

Preferably, the main beam 46 is comprised of two telescoping members: an outer elongated tubular beam 50 and an elongated inner beam 52. In this way, the length of the main beam 46 can be greatly extended, if desired, so as to accommodate larger airplanes as will become more apparent hereinafter.

A secondary and transverse cross beam 54 is connected to one end 56 of the main beam 46. This is done through the use of mutually perpendicular sleeve connectors 58 and 60 and connecting post 62. The positions of the cross beams 54 and sleeve connectors can be adjusted by loosening the set screws shown, for example, at 64 and 66 and sliding the sleeve connectors relative to the beams, etc. In the preferred embodiment of the invention, the beams and sleeve connectors are all of square cross section so as to prevent any rotational movement of the various component parts. Thus, irrespective of the height of the cross beam 54, its position along the length of the main beam 46 or the position of the sleeve connector 60 along the length of the beam 54, the beam 54 will always be perpendicular to the main beam 46.

Secured to the rear end 68 of the main beam 46 is an additional sleeve connector 70 which has mutually perpendicular sleeve parts 72 and 74. The position of the sleeve connector 70 can be adjusted by loosening the set screw 76. If desired, the sleeve connector 70 can be secured to the inner telescoping beam member 52 and can, therefore, be moved a substantial distance from the cross beam 54.

The vertical leg 78 of an L-shaped bar passes through the sleeve 74 of the sleeve connector 70. The height thereof can be adjusted through the use of a set screw (not shown). The horizontal leg 80 of the L-shaped rod extends at right angles, to the side of the main beam 46. The horizontal leg and the secondary or cross bar 54 are substantially parallel to each other since each is perpendicular to the main beam 46.

Adjustably connected to the ends of the cross beam 54 are front wheel and clamping support means 82 and 84. Similarly, rear wheel support and clamp means 86 is adjustably carried by the horizontal leg 80. Since each of the wheel and clamping means 82, 84 and 86 is identical to the others, only one will now be described in detail. It should be clearly understood that the following explanation applies equally to all of the wheel support and clamping means.

Figure 4:
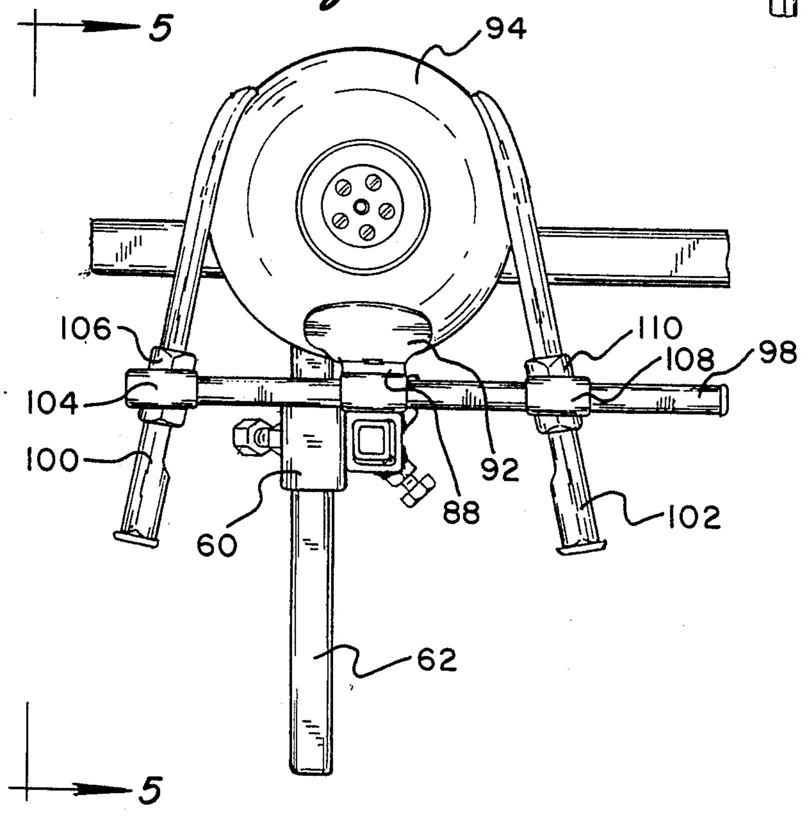
FIG. 4 is a side elevational view taken through the lines 4—4 of FIG. 3.
Figure 5:
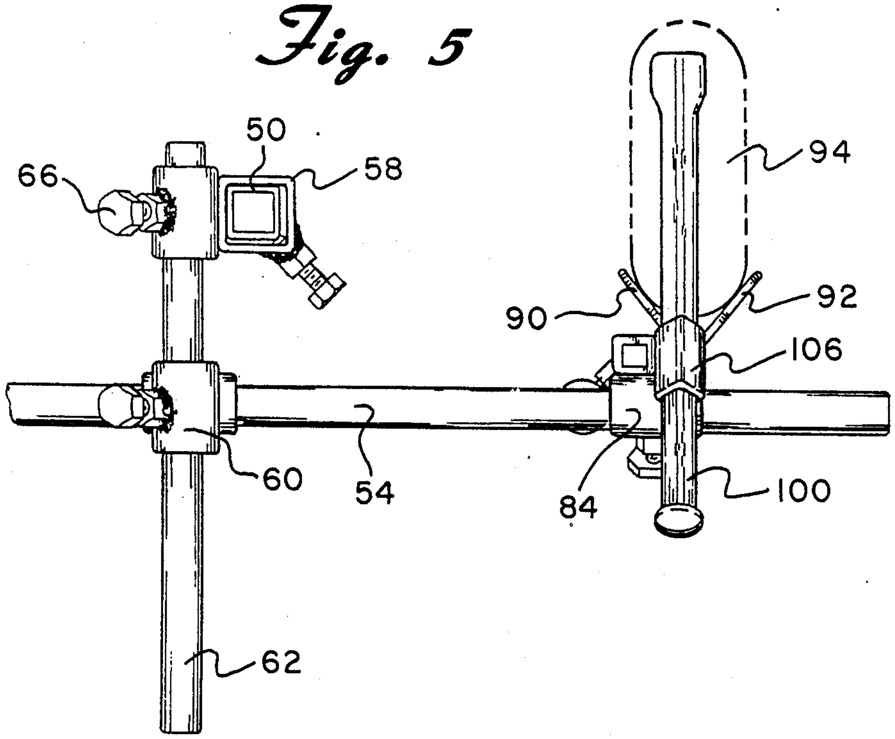
FIG. 5 is a partial front elevational view taken through the lines 5—5 of FIG. 4.

As shown most clearly in FIGS. 1, 4 and 5, each wheel support means includes a saddle seat 88 which has upwardly and outwardly extending walls 90 and 92. A wheel 94, in this case the front left wheel of the airplane 96, is adapted to rest on the saddle 88.

A rod 98 parallel to the main beam 46 is slideably connected to the saddle 88 and can be moved forwardly or rearwardly. An appropriate set screw (not shown) may be used to maintain the rod in its desired position. A pair of substantially spoon-shaped wheel clamps 100 and 102 are carried by the rod 98. The forward wheel clamp 100 is secured to the forward end of the rod 98 through connector 104 which permits the clamping element 100 to be moved upwardly and at a slight angle rearwardly through the sleeve 106 but does not permit movement along the length of the rod 98. Connector 108 similarly allows the clamping element 102 to move upwardly and at an angle forwardly through the slide element 110. However, connector 108 is also slideably connected to the rod 98 so that the same can be moved along the axis of the rod 98 and can be maintained in place through the use of a set screw (not shown).

The model airplane jig or workbench 10 just described is utilized in the following manner. The feet 14 of the base 12 are first adjusted so that the post 16 is vertical. This can be done utilizing a carpenter's level or similar tool. The position of the slide connectors 58 and 70 are then adjusted so that the front wheel supports 82 and 84 and the rear wheel support 86 are at the proper distance from each other, from front to back. The front wheel supports 82 and 84 are then adjusted from left to right, as viewed in FIG. 1, so that they are the proper distance from each other. The rear wheel support 86 is then moved transversely so as to be in the middle of the front wheel supports 82 and 84. The wheel supports 82, 84 and 86 should now be in exactly the same positions relative to each other as the wheels on the airplane 96.

The plane 96 is then placed on the workbench 10 by placing each of the wheels in the saddle of its respective wheel support 82, 84 or 86. In order to make room for the wheel such as wheel 94 as viewed in FIG. 4, the rod 98 will have been moved forwardly and the connector 108 carrying the spoon 102 will have been moved rearwardly.

Once each wheel is resting on its respective saddle, the clamping elements 100 and 102 are raised so as to be above the level of the wheel 94 and the rod 98 is then moved backwardly so that the element 100 contacts the wheel. The connector 108 is then moved forwardly so that the clamping element 102 contacts the rear of the wheel. At this point, both clamping elements 100 and 102 are pushed downwardly through their respective slide holders 106 and 110. Since the wheels are made of rubber or other elastic material, they place a torquing force on the spoon-shaped clamping elements when these elements are pressed downwardly onto the wheels. This torquing or rotating force in combination with the frictional fit between the clamping elements and their respective sleeves 106 and 110 maintain the clamping elements in position.

Figure 3:
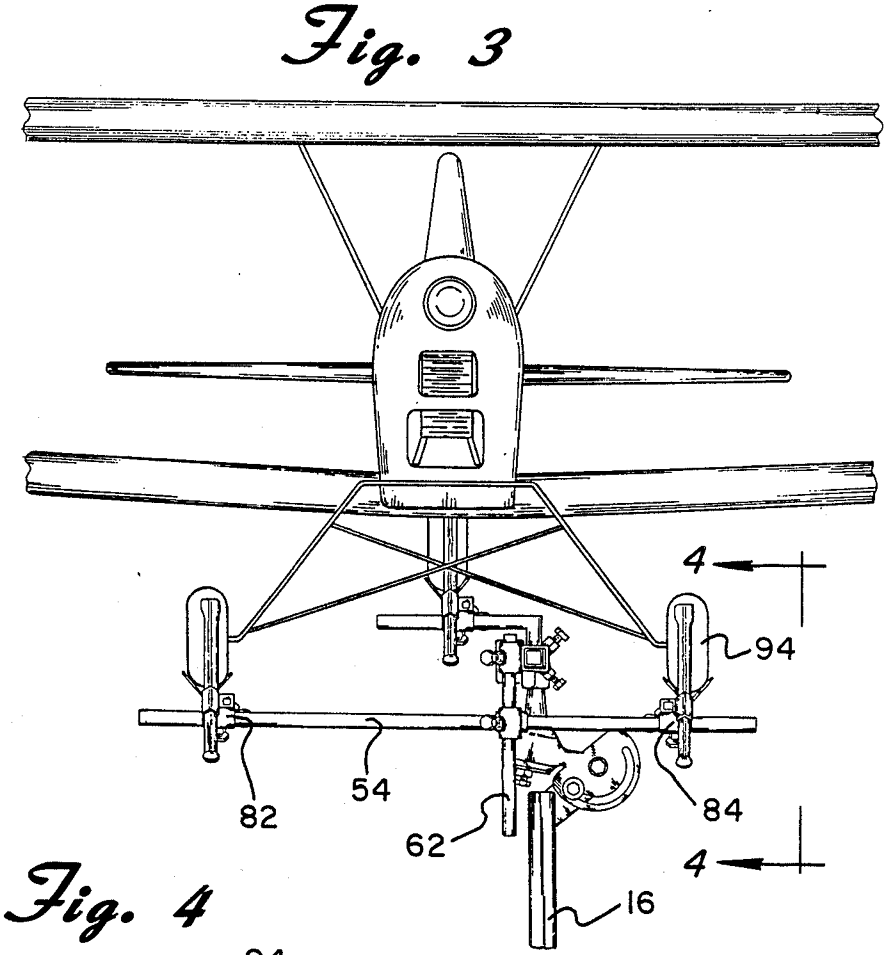
FIG. 3 is a front elevational view taken through the lines 3—3 of FIG. 2.
Figure 8:
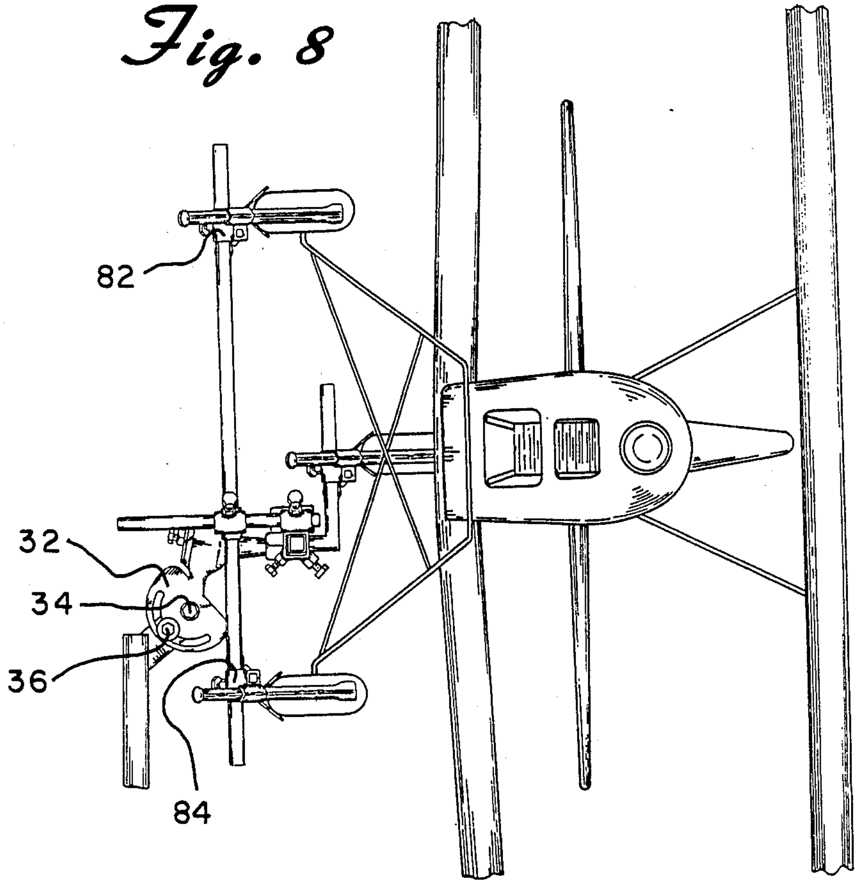
FIG. 8 is a view similar to FIG. 3 but showing the airplane rotated through an angle of 90°.
Figure 9:
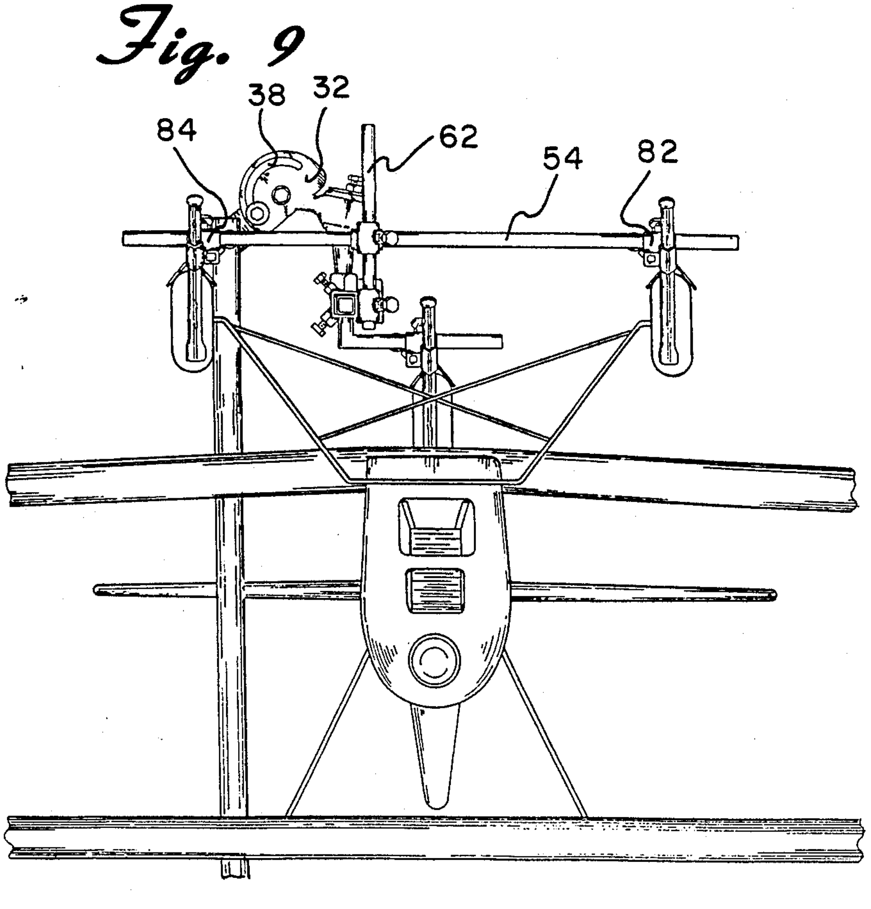
FIG. 9 is a view similar to FIGS. 3 and 8 but showing the airplane rotated through an angle of 180°.

As shown in FIGS. 3, 6, 8 and 9, the airplane can be rotated through the use of the trunnion 32 from a position where it is substantially horizontal as shown in FIG. 3 to intermediate positions wherein the plane is essentially on its side to the extreme position shown in FIG. 9 where the plane is upside down. As a result of the tab 26 and the yoke 30, the plane is offset, i.e. to the right as shown in FIG. 3 of the beam 16 when it is in its upside down position, so that the fuselage does not contact the beam. Although the airplane is shown in FIGS. 3, 8 and 9 as always facing forward, it should be readily apparent that, through the use of the ball joint 28, the plane can also be rotated so as to face upwardly or downwardly when it is in the position shown in FIG. 8 or to the left or right when it is in the position shown in FIG. 3 or, obviously, any angle in between.

Figure 10:
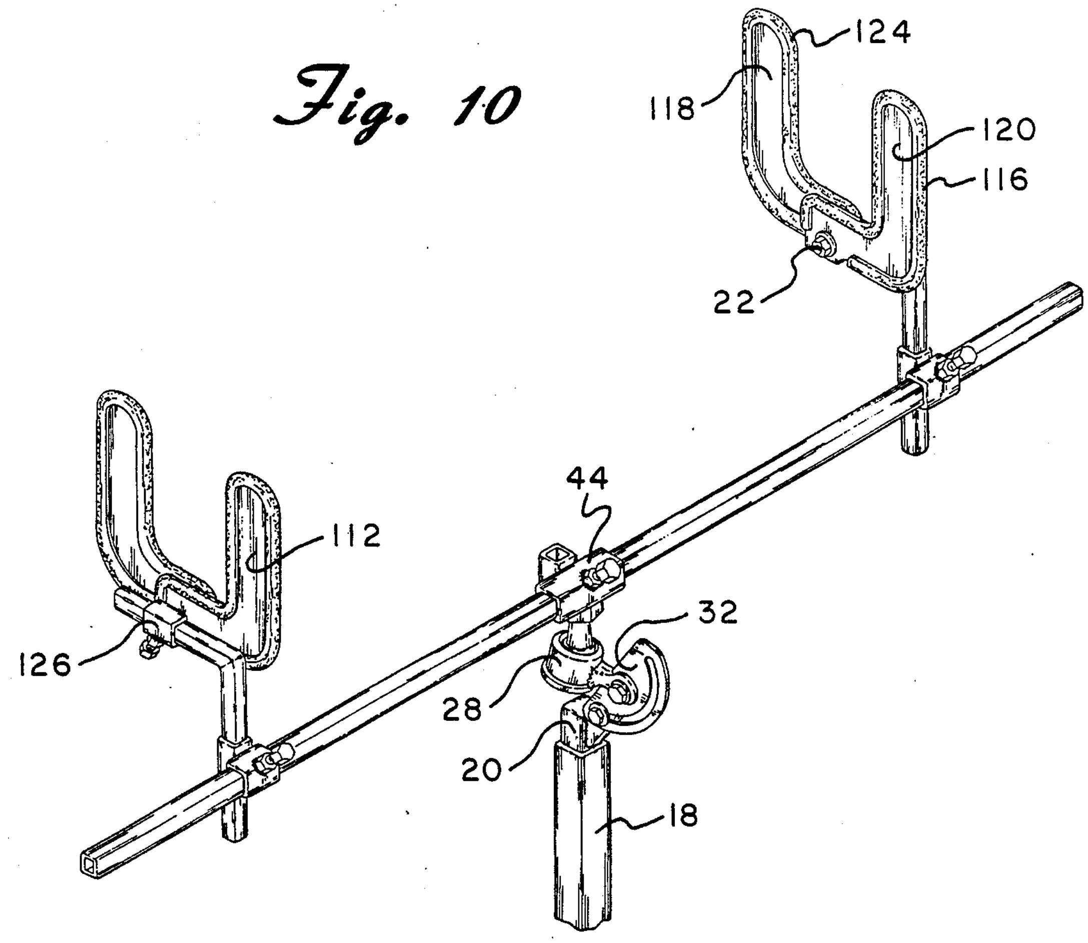
FIG. 10 is a view of the upper portion of the airplane jig similar to FIG. 1 but showing the use of fuselage saddles in lieu of the wheel clamps.
Figure 11:
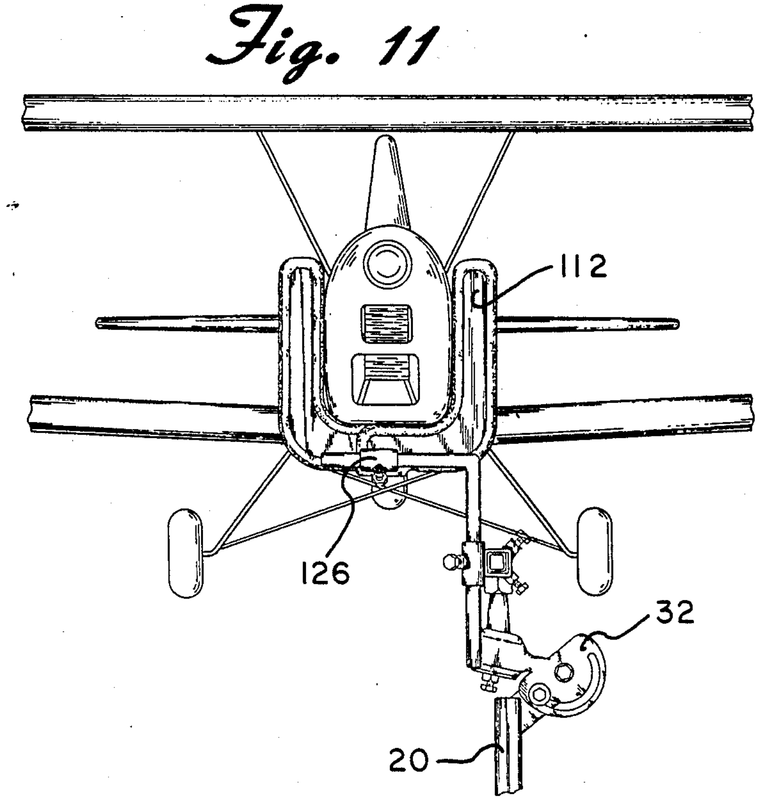
FIG. 11 is a front elevational view similar to FIG. 3 but showing the airplane supported by the fuselage saddles.

If it is ever desired to work on the wheels of the airplane, the invention is also provided with fuselage saddles 112 and 116 as shown in FIGS. 10 and 11. Each of the saddles 112 and 116 is comprised of left and right L-shaped members 118 and 120 which are pivotally secured together through a bolt 122 at their lower portions thereof so as to form U-shaped members. The legs of the U which are preferably covered with a padding material such as shown at 124 in order to protect the fuselage of the airplane can be moved away or toward each other so as to conform as closely as possible to the shape of the fuselage. Each of the fuselage saddles 112 and 116 is mounted on a slide connector such as shown at 126 and each slide connector 126 is mounted on the horizontal leg of an L-shaped post such as leg 80 previously described.

The present invention may be embodied in other specific forms without departing from the spirit or essential attributes thereof and accordingly reference should be made to the appended claims rather than to the foregoing specification as indicating the scope of the invention.

I claim:

1. A model airplane jig comprising:
- a weighted base;
- a vertical post extending upwardly from said base;
- an elongated main beam;
- means connecting said main beam intermediate the ends thereof to the top of said vertical post;
- said connecting means permitting said beam to be movable between a first position wherein it is located substantially above said vertical post and a second position wherein it is inverted and located at a position horizontally spaced from said vertical post;
- a rear support means adjustably connected to one end of said main beam, said rear support means including means for clamping the rear wheel of a model airplane;
- a secondary cross beam adjustably connected to the other end of said main beam and being substantially perpendicular thereto;
- left and right forward support means adjustably connected to either end of said second cross beam, each of said forward support means including means for clamping a different one of the two front wheels of a model airplane,
- each of said support means including a saddle member for supporting the underside of the wheel and a pair of adjustable clamping elements adapted to hold the top of the wheel.

2. The invention as claimed in claim 1 wherein said vertical post is comprised of two telescoping members for adjusting the height thereof.

3. THe invention as claimed in claim 1 wherein said main beam is comprised of two telescoping members for adjusting the length thereof.

4. The invention as claimed in claim 1 wherein said base includes a plurality of adjustable levelers thereon

5. The invention as claimed in claim 1 wherein said left and right forward support means are movable toward and away from each other.

6. The invention as claimed in claim 1 wherein said connecting means includes a ball joint.

7. A model airplane jig comprising:
- a weighted base;
- a vertical post extending upwardly from said base;
- an elongated main beam;
- means connecting said main beam intermediate the ends thereof to the top of said vertical post;
- said connecting means permitting said beam to be movable between a first position wherein it is located substantially above said vertical post and a second position wherein it is inverted and located at a position horizontally spaced from said vertical post;
- a rear support means adjustably connected to one end of said main beam, said rear support means including means for clamping the rear wheel of a model airplane;
- a secondary cross beam adjustably connected to the other end of said main beam and being substantially perpendicular thereto;
- left and right forward support means adjustably connected to either end of said second cross beam, each of said forward support means including means for clamping a different one of the two front wheels of a model airplane,
- said connecting means including a tab extending upwardly and outwardly from the top of said vertical post and wherein said main beam is pivotally connected to said tab.

8. The invention as claimed in claim 7 wherein said connecting means includes a ball joint between said main beam and said tab.

9. The invention as claimed in claim 1 further including a pair of substantially U-shaped fuselage supports extending upwardly from said main beam for supporting the fuselage of the plane.

10. The invention as claimed in claim 7 wherein said vertical post is comprised of two telescoping members for adjusting the height thereof.

11. The invention as claimed in claim 7 wherein said main beam is comprised of two telescoping members for adjusting the length thereof.

12. The invention as claimed in claim 7 wherein each of said support means includes a saddle member for supporting the underside of the wheel and a pair of adjustable clamping elements adapted to hold the top of the wheel.

13. The invention as claimed in claim 7 wherein said base includes a plurality of adjustable levelers thereon.

14. The invention as claimed in claim 7 wherein said left and right forward support means are movable toward and away from each other.

15. The invention as claimed in claim 7 wherein said connecting means includes a ball joint.

16. The invention as claimed in claim 7 further including a pair of substantially U-shaped fuselage supports extending upwardly from said main beam for supporting the fuselage of the plane.

* * * * *